US012657929B2

(12) United States Patent
Kang

(10) Patent No.: US 12,657,929 B2
(45) Date of Patent: Jun. 16, 2026

(54) METHOD AND APPARATUS FOR DETERMINING DRIVING RISKS BY USING DEEP LEARNING ALGORITHMS

(71) Applicant: HL KLEMOVE CORP., Incheon (KR)

(72) Inventor: Sougjun Kang, Gyeonggi-do (KR)

(73) Assignee: HL KLEMOVE CORP., Incheon (KR)

( * ) Notice: Subject to any disclaimer, the term of this patent is extended or adjusted under 35 U.S.C. 154(b) by 322 days.

(21) Appl. No.: 18/241,210

(22) Filed: Aug. 31, 2023

(65) Prior Publication Data

US 2024/0212361 A1     Jun. 27, 2024

(30) Foreign Application Priority Data

Dec. 23, 2022     (KR) ........................ 10-2022-0182596

(51) Int. Cl.
| | |
|---|---|
| *G06V 20/58* | (2022.01) |
| *G06V 10/44* | (2022.01) |
| *G06V 10/774* | (2022.01) |
| *G06V 10/82* | (2022.01) |
| *G08G 1/16* | (2006.01) |
| *B60W 50/00* | (2006.01) |

(52) U.S. Cl.
CPC ............ *G06V 20/58* (2022.01); *G06V 10/449* (2022.01); *G06V 10/774* (2022.01); *G06V 10/82* (2022.01); *G08G 1/161* (2013.01); *B60W 50/0098* (2013.01); *B60W 2420/403* (2013.01); *B60W 2420/408* (2024.01)

(58) Field of Classification Search
None
See application file for complete search history.

(56) References Cited

U.S. PATENT DOCUMENTS

2022/0126818 A1*    4/2022    Marcotte ............. B60W 30/095

FOREIGN PATENT DOCUMENTS

| | | |
|---|---|---|
| CN | 112382115 | 2/2021 |
| KR | 10-2019-0031951 | 3/2019 |
| KR | 10-2275017 | 7/2021 |
| KR | 10-2387920 | 4/2022 |

OTHER PUBLICATIONS

Office Action dated Jul. 31, 2024 for Korean Patent Application No. 10-2022-0182596 and its English translation provided by Applicant's foreign counsel.

* cited by examiner

*Primary Examiner* — Leon Flores
(74) *Attorney, Agent, or Firm* — WOMBLE BOND DICKINSON (US) LLP

(57)     ABSTRACT

An apparatus and method for determining driving risks of a driver using deep learning algorithms and a vehicle including the same are provided. The apparatus comprises a processor, a network interface, a memory, and a computer program loaded to the memory and executed by the processor, wherein the processor is configured to receive image data and CAN data obtained by a vehicle equipped with a lidar sensor or a camera sensor while the vehicle is driving, input the obtained image data and CAN data to a first deep learning algorithm trained through pre-stored image data to output image features related to driving risks of a driver driving the vehicle, output image features related to the driver's driving risk by the first deep learning algorithm, and capture a first image corresponding to the output image features and transmit the captured first image to a connect program.

18 Claims, 9 Drawing Sheets

METHOD AND APPARATUS FOR DETERMINING DRIVING RISKS BY USING DEEP LEARNING ALGORITHMS

TECHNICAL FIELD

The present disclosure generally relates to a method and apparatus for determining driving risks of a driver using deep learning algorithms. More specifically, some embodiments of the present disclosure relate to a method and apparatus for determining driving risks of a driver by analyzing images of driving risks and information on time points in risky driving situations using an image recognition-based deep learning algorithm and a reinforcement learning algorithm.

BACKGROUND

As the number of self-driving vehicles increases, accidents related to the self-driving vehicles are increasing. In particular, many of the accidents related to the self-driving vehicles are caused due to the limitations of self-driving solely based on predetermined rules without fully understanding the driver's intentions.

Insurance companies that cover drivers and vehicles are also developing more precise methods to determine driving risks for preparing the potential risks related to autonomous driving.

Traditionally, insurance companies that cover drivers and vehicles have determined a driver's driving risk based on simple information related to vehicle operations. However, the rapid spread of self-driving vehicles and artificial intelligence (AI) technologies has necessitated the transformation of traditional information into more advanced information.

Therefore, it is necessary for insurance companies that deal with drivers and vehicles to utilize the AI technologies in determining the driving risk of drivers more accurately and to provide more accurate information related to insurance products. Through the information, innovative technologies and ideas may be developed to provide drivers with a report on their driving patterns and assistive driving information.

Unless otherwise indicated herein, the description in this Background section is not prior art to the claims in the present application and is not admitted to be prior art by inclusion in this Background section.

SUMMARY

An object of some embodiments of the present disclosure may be to provide a method and apparatus for calculating and providing driving risks of a driver driving a vehicle.

Another object of certain embodiments of the present disclosure may be to provide a method and apparatus for utilizing information that underlies more accurate calculation of driving risks by utilizing two deep learning algorithms.

Still another object of some embodiments of the present disclosure may be to provide a method and apparatus for running a more effective deep learning algorithm by analyzing time points of capturing risky driving situations of a driver based on a reinforcement learning algorithm, which is one of two deep learning algorithms used in calculating driving risks.

To achieve the object above, according to some embodiments of the present disclosure, an apparatus for determining a driver's driving risk using a deep learning algorithm comprises a processor, a network interface, a memory, and a computer program loaded to the memory and executed by the processor, wherein the processor is configured to receive image data and CAN data obtained by a vehicle equipped with a lidar sensor or a camera sensor while the vehicle is driving, input the obtained image data and CAN data to a first deep learning algorithm trained through pre-stored image data to output image features related to driving risks of a driver driving the vehicle, output image features related to the driver's driving risk by the first deep learning algorithm, and capture a first image corresponding to the output image features and transmit the captured first image to a connect program.

In one embodiment, the first deep learning algorithm is based on the Convolutional Neural Network (CNN) and may include at least one of a convolution layer, a fully connected layer, and an activated function layer.

In one embodiment, the image feature may be an image feature extracted by at least one filter included in the CNN.

In one embodiment, the capturing of the first image corresponding to the output image features and transmitting of the captured first image to the connect program may transmit the first image to the connect program by including information on the risky situations of the driver therein.

In one embodiment, the processor may calculate the driver's safety score based on the first image and transmit the calculated safety score together with the information on the risky situations of the driver.

In one embodiment, the processor may calculate information on a first time point of capturing the first image corresponding to the output image features, input the first image and the first time point information to a second deep learning algorithm trained to output features at a time point of capturing pre-stored images related to the driving risks of the driver driving the vehicle, and output information on a second time point of capturing an image by the second deep learning algorithm.

In one embodiment, the second deep learning algorithm is a reinforcement learning algorithm, which may include at least one of the algorithms utilizing DQN, Q-learning, genetic, and SARSA techniques.

In one embodiment, the second time point may be different from the first time point, the second image obtained at the second time point may be applied to the first deep learning algorithm, and the image features output from the first deep learning algorithm may be different from the image features related to the first image output from the first deep learning algorithm.

In one embodiment, the first deep learning algorithm may learn the image features of the second image by applying the second image obtained at the second time point to the first deep learning algorithm.

In one embodiment, when the first deep learning algorithm learns image features of the second image, weights related to feature learning may be configured, wherein the weights may be different from those used by the first deep learning algorithm during a learning process through pre-stored image data.

According to the present disclosure described above, an image of a risky driving situation may be captured while a driver is driving a vehicle, and the driver's driving risk may be calculated based on the captured image, thereby determining the driver's risky situation more accurately.

Also, according to the present disclosure described above, as at least one or more deep learning algorithms continue to learn risky situations, the accuracy of an apparatus for determining a driver's driving risk may be improved over time.

Also, according to the present disclosure described above, time points at which image are captured may be learned through a reinforcement learning algorithm, and the accuracy of the image capture algorithm may be improved by calculating the time points.

DETAILED DESCRIPTION

Figure 1:
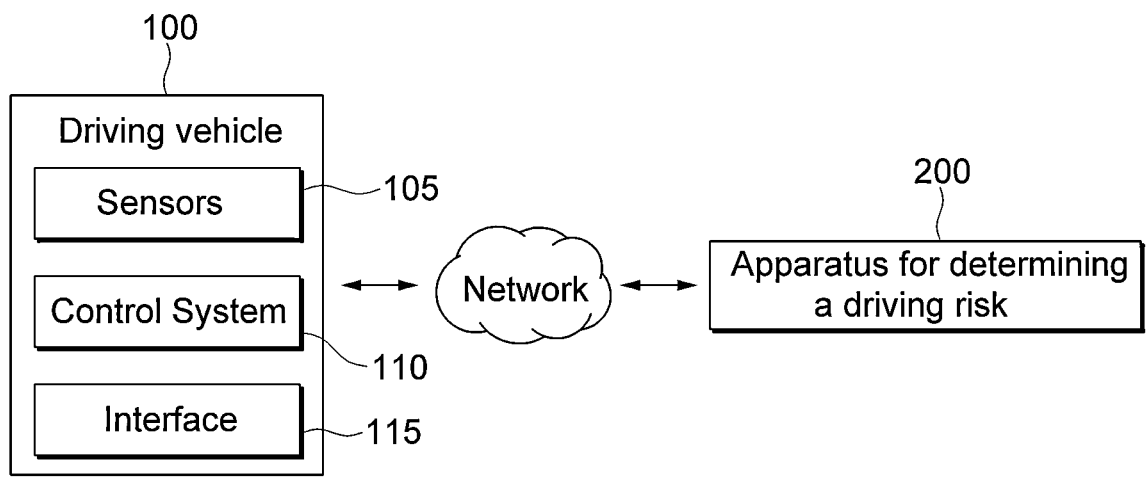
FIG. 1 shows an exemplary environment to which an apparatus for determining a driving risk according to some embodiments of the present disclosure may be applied.

In what follows, preferred embodiments of the present disclosure will be described in detail with reference to appended drawings. The advantages and features of the present disclosure, and a method for achieving them will be clearly understood with reference to the embodiments described in detail together with appended drawings. However, the technical principles and spirit of the present disclosure are not limited to the embodiments disclosed below but may be implemented in various other forms; rather, the present embodiments are provided to make the present disclosure complete and inform those skilled in the art clearly of the technical scope of the present disclosure, and the technical principles and spirit of the present disclosure may be defined within the technical scope of the appended claims.

In assigning reference symbols to the constituting elements of each drawing, it should be noted that the same constituting elements are intended to have the same symbol as much as possible, even if they are shown on different drawings. Also, in describing the present disclosure, if it is determined that a detailed description of a related well-known configuration or function incorporated herein unnecessarily obscure the gist of the present disclosure, the detailed description thereof will be omitted.

Unless otherwise defined, all terms (including technical and scientific terms) used herein may be used in a sense commonly understood by those skilled in the art to which the present disclosure belongs. Also, terms defined in commonly used dictionaries are not ideally or excessively interpreted unless otherwise explicitly defined. The terms used herein are intended to describe embodiments and are not intended to limit the present disclosure. In the present disclosure, a singular expression includes a plural expression unless clearly indicated otherwise in the corresponding phrase.

Also, in describing the constituting elements of the present disclosure, terms such as first, second, A, B, (a), and (b) may be used. Such terms are intended only to distinguish one constituting element from the others and do not limit the nature, sequence, or order of the constituting element. If a constituting element is said to be "linked to," "combined with," or "connected to" a different constituting element, it should be understood that the constituting element is linked or connected to the different constituting element, but another constituting element may be "linked," "combined," or "connected" between the two constituting elements.

The term "comprises" and/or "comprising" used in the present disclosure indicates the existence of a constituting element, a step, an operation, and/or a component described but does not exclude the existence or addition of one or more other constituting elements, steps, operations, and/or components.

In what follows, various embodiments of the present disclosure will be described in detail with reference to appended drawings.

Also, in describing the constituting elements of the present disclosure, terms such as first, second, A, B, (a), and (b) may be used. Such terms are intended only to distinguish one constituting element from the others and do not limit the nature, sequence, or order of the constituting element. Throughout the disclosure, unless otherwise explicitly stated, if a particular element is said to "include" or "have" some particular element, it means that the former may further include other particular elements rather than exclude them. Also, the term "unit" or "module" used in the document refers to a base unit for processing at least one function or operation, which may be implemented by hardware or software or a combination of both.

FIG. 1 shows an exemplary environment to which an apparatus for determining a driving risk according to some embodiments of the present disclosure may be applied. The driving risk of a driver driving a vehicle 100 may be determined through a system shown in FIG. 1, which includes the driving vehicle 100 and an apparatus 200 for determining a driving risk, and the determined driving risk may be output or provided to the driver.

In what follows, the operations of each element of the system shown in FIG. 1 will be described in more detail with respect to a method for determining the driving risk of the driver driving the vehicle 100 through the system above.

FIG. 1 shows an example in which the driving vehicle 100 and the apparatus 200 for determining the driving risk are connected through a network. However, it should be noted that the example is provided solely for the convenience of understanding the present disclosure, and the number of devices that may be connected to the network may be selected as desired.

Meanwhile, FIG. 1 only illustrates a preferred embodiment for achieving the object of the present disclosure, and some components may be added or omitted if necessary. In what follows, the elements of FIG. 1 will be described in more detail.

The apparatus 200 for determining the driving risk may determine the level of the driving risk of the driver driving the vehicle 100 and provide the determined driving risk level to the driver. Here, the apparatus 200 for determining the driving risk may collect and analyze various information generated from the driving vehicle 100.

The various information may include various kinds of data generated by the driving vehicle 100, which may include, for example, but not limited to, the speed of the driving vehicle 100, the wheel angle of a steering device included in the vehicle 100, and the specifications of the driving vehicle 100, and the information may further include information on the environment in which the vehicle is driving. The information may be collected using a series of devices comprised in the driving vehicle 100, but it should be noted by those skilled in the art that the series of devices include various kinds of electronic devices belonging to the driving vehicle 100. Also, the information may include information collected while the vehicle 100 is stationary, as well as when the vehicle 100 is driving. Alternatively, the information related to the vehicle 100 may be generated and transmitted from other vehicles around the vehicle 100 to the apparatus 200 for determining the driving risk or the vehicle 100.

The driving vehicle 100 illustrated in FIG. 1 may include a vehicle not equipped with autonomous driving technology in addition to a vehicle equipped with autonomous driving technology or an advanced driver assist system (ADAS). The driving vehicle 100 may include a four-wheeled vehicle and a two-wheeled motorcycle. Also, the driving vehicle 100 may include sensors 105 configured to obtain light detection and ranging (LiDAR) and image data while the vehicle 100 is driving, a control system 110 configured to physically or mechanically control the driving of the vehicle 100, and at least one interface 115 for receiving and transmitting signals related to obstacles, objects and other vehicles recognized while the vehicle 100 is driving.

Here, the sensor that acquires lidar and image data may include a 2D lidar sensor and a 3D lidar sensor and may also include a camera and a sensor that acquires image data. The control system may include various kinds of electronic devices, physical machines, and mechanical devices that physically or mechanically drive, control, or move the driving vehicle 100, and the interface may be a device installed in the driving vehicle 100 and providing a communication function that allows internal communication between electronic components or products and devices included in the driving vehicle 100 to communicate with each other. Also, the interface may be a device capable of transmitting and receiving electronic signals, data, and information between the driving vehicle 100 and other vehicles and external electronic devices.

To avoid repeated descriptions, various operations performed by the apparatus 200 for determining the driving risk will be described in more detail with reference to FIG. 2 and subsequent drawings.

Meanwhile, the apparatus 200 for determining the driving risk may be implemented using one or more computing devices, computers or processors. For example, all the functions of the apparatus 200 for determining the driving risk may be implemented by a single computing device, computers or processors. As another example, a first computing device, computer or processor may perform or implement a first function or operation of the apparatus 200 for determining the driving risk, and a second computing device, computer or processor may implement a second function or operation. Here, the computing device, computer or processor may include, but not limited to, a notebook computer, a desktop computer, or a laptop computer and may include various kinds of devices equipped with a computing function. However, it may be preferred that the apparatus 200 for determining the driving risk may be implemented by a high-performance server-class computing device, although not required. One example of the computing device, computer or processor will be described with reference to FIG. 9.

Also, functions that may be additionally implemented in the apparatus 200 for determining the driving risk may be implemented by utilizing one or more electronic devices or components included or installed in the driving vehicle 100. Therefore, although FIG. 1 depicts the apparatus 200 for determining the driving risk of the driver separately from the driving vehicle 100, it should be noted that the apparatus 200 for determining the driving risk according to another embodiment of the present disclosure may be mounted to or on the driving vehicle 100, and therefore the apparatus 200 for determining the driving risk implements or performs the first and second functions within or in the driving vehicle 100. Therefore, the embodiment depicted in FIG. 1, where the driving vehicle 100 and the apparatus 200 for determining the driving risk are separated from each other, is just one example, and the present disclosure should not be limited thereto.

For the convenience of descriptions, the present disclosure assumes that the driving vehicle 100 and the apparatus 200 for determining the driving risk perform their functions independently of each other.

According to some embodiments of the present disclosure, constituting elements included in an environment to which the apparatus 200 for determining the driving risk is applied may communicate through a network. The network may be implemented using all kinds of wired and wireless networks, including a local area network (LAN), a wide area network (WAN), a mobile radio communication network, and a wireless broadband (Wibro) network.

Meanwhile, the environment depicted in FIG. 1 assumes that the driving vehicle 100 is connected to the apparatus 200 for determining the driving risk through a network. However, the scope of the present disclosure is not limited to this assumption. For example, the driving vehicle 100 may be connected to the apparatus 200 for determining the driving risk through a peer to peer (P2P) network.

Up to this point, an exemplary environment to which the apparatus 200 for determining the driving risk according to some embodiments of the present disclosure may be applied has been described. In what follows, with reference to FIG. 2 and subsequent drawings, methods according to various embodiments of the present disclosure will be described in detail.

A computing device, computer or processor may perform each step of the methods to be described later. For instance, each step of the methods may be implemented by one or more instructions executed by a processor of the computing device. Some or all of the steps or operations included in the methods according to certain embodiments of the present disclosure may be performed by one physical computing device. Alternatively, first steps of the methods may be performed by a first computing device, computer or processor, and second steps of the methods may be performed by a second computing device, computer or processor.

Figure 2:
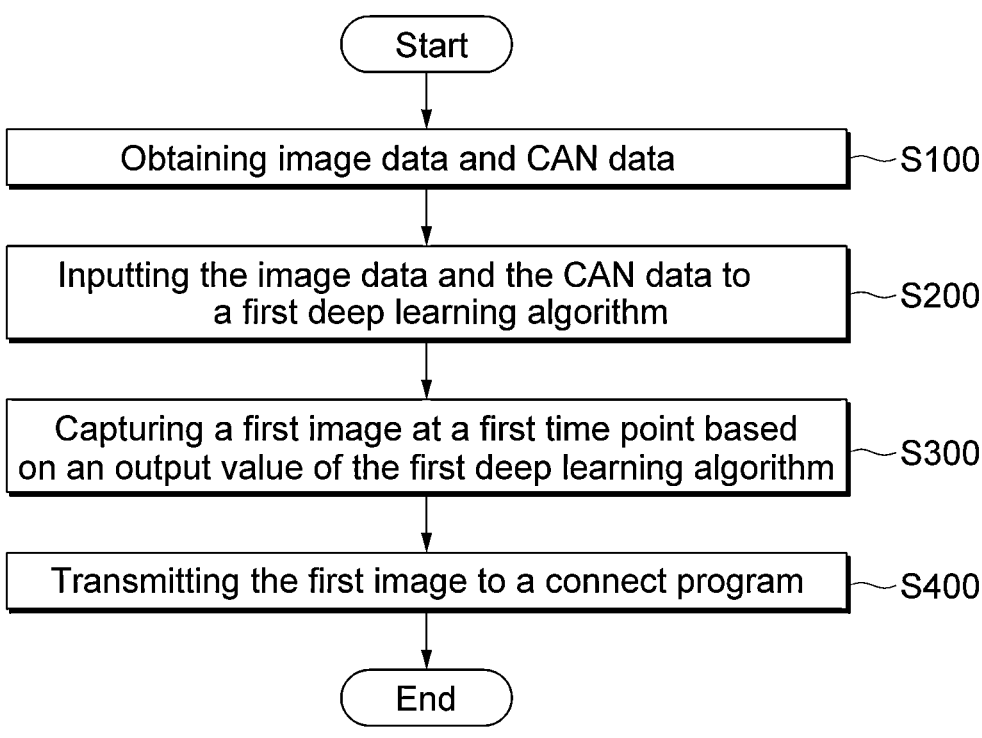
FIG. 2 is a flowchart for illustrating a method for analyzing image data related to risky driving situations of a driver, which may be performed by an apparatus for determining a driving risk of a driver according to certain embodiments of the present disclosure.

In what follows, FIG. 2 continues the description based on the assumption that each step of the methods is performed by the apparatus 200 for determining a driving risk of FIG. 1. However, for the sake of convenience, descriptions of the operating entity for each step or operation included in the methods may be omitted.

FIG. 2 is a flowchart for illustrating a method for analyzing image data related to risky driving situations of a driver, which may be performed by an apparatus for determining a driving risk of a driver according to certain embodiments of the present disclosure.

In step S100, the apparatus 200 for determining the driving risk may obtain or receive image data and Controller Area Network (CAN) data.

Here, the image data may refer to data obtained while the vehicle 100 is driving. For example, the image data may refer to image data sensed or obtained by various sensors installed to or included in the driving vehicle 100.

Alternatively, the image data may be obtained through a camera sensor, an image sensor, and a 3D lidar device installed to or included in the driving vehicle 100, where the image data may capture the front, rear, side, and corner scenes of the driving vehicle 100. The recording format of the image data according to the present disclosure is not limited to a specific format, where the image data may be stored with image file extensions such as png, jpg, or jpeg.

The CAN data obtained by the apparatus 200 for determining the driving risk stands for Controller Area Network data, which may be data obtained during communication between electronic control units (ECUs) of a vehicle. Therefore, the CAN data may be data communicated between two or more electronic components included in the driving vehicle 100. The CAN data may be obtained through a structure in which electronic components included in the driving vehicle 100 are connected in parallel and exchange data with each other.

In step S200, the apparatus 200 for determining for the driving risk may input image data and CAN data to a first deep learning algorithm.

The apparatus 200 for determining the driving risk may input the image data to the first deep learning algorithm to train the first deep learning algorithm. The first deep learning algorithm may be one type of deep learning algorithm that receive image data, extract features from the image data, and extract resultant values related to the features. Also, the first deep learning algorithm may be one type of supervised learning algorithm, where the first deep learning algorithm learns input labeling data and, based on the learning of the input labeling data, returns an output value corresponding to the labeling data when new data is input. Therefore, the first deep learning algorithm may be, for example, but not limited to, an algorithm including a deep learning architecture such as the convolutional neural network (CNN), LSRM, or RNN.

According to some embodiments of the present disclosure, the first deep learning algorithm may be a CNN model. The CNN model may include a convolutional layer, a pooling layer, a fully connected layer, and an activating function layer.

The convolutional layer includes at least one or more filters, and each of the filters may have characteristics relevant to a specific shape. For example, in the case of an edge filter to extract the outline of an object, the filter may have a characteristic relevant to a specific shape, such as a line that encloses an image. When the edge filter is applied to an image, feature information relevant to the edge filter may be obtained. A feature map may be extracted through at least one or more filters included in the convolutional layer.

The pooling layer may be structurally placed between convolutional layers. Alternatively, pooling layers may be placed hierarchically after a plurality of convolutional layers. The pooling layer performs a function of extracting a specific value for a given region from the feature map extracted through the convolutional layer. There are several types of pooling layers, for instance, but not limited to, a max pooling layer and a median pooling layer.

The fully connected layer may perform an image classification function on feature maps extracted through at least one or more convolutional layers and pooling layers. For example, the fully connected layer may place feature maps in a row and classify an image through a hidden layer.

The activation function layer may be applied to the feature map. The activation function layer may convert a quantitative value from the fully connected layer into a result indicating whether or not feature information is included.

Also, the CNN model according to certain embodiments of the present disclosure may comprise a max pooling layer, one or more of convolutional layers, a fully connected layer, and a softmax layer. It should be noted, however, that the structure above is only an example and does not limit the scope of the present disclosure.

The first deep learning algorithm included in the apparatus 200 for determining the driving risk may have already completed learning before the image data and CAN data are input to the first deep learning algorithm. Accordingly, the first deep learning algorithm included in the apparatus 200 for determining the driving risk may be in a state in which the first deep learning algorithm has learned labeling data for risky driving situations generated according to a criterion set in advance from among image data and CAN data. More specifically, the first deep learning algorithm included in the apparatus 200 for determining the driving risk may learn the image data labeled as one of three driving situations including a risky driving situation, a normal driving situation, and a safe driving situation. The three driving situations described above is only one example for explaining driving situations. Thus, it should be noted that the present disclosure is not limited to the above example, and the labeling process is not limited to the specific example above. Therefore, image data of the risky driving situation, the normal driving situation, and the safe driving situation may be labeled in the form of 2, 1, and 0 and used to train the first deep learning algorithm.

Accordingly, when image data is input, the first deep learning algorithm may learn features of the labeled image data and provide an output value based on the features of the image data.

In what follows, specific exemplary embodiments of a learning process by the first deep learning algorithm will be described in detail with reference to FIG. 3.

Figure 3:
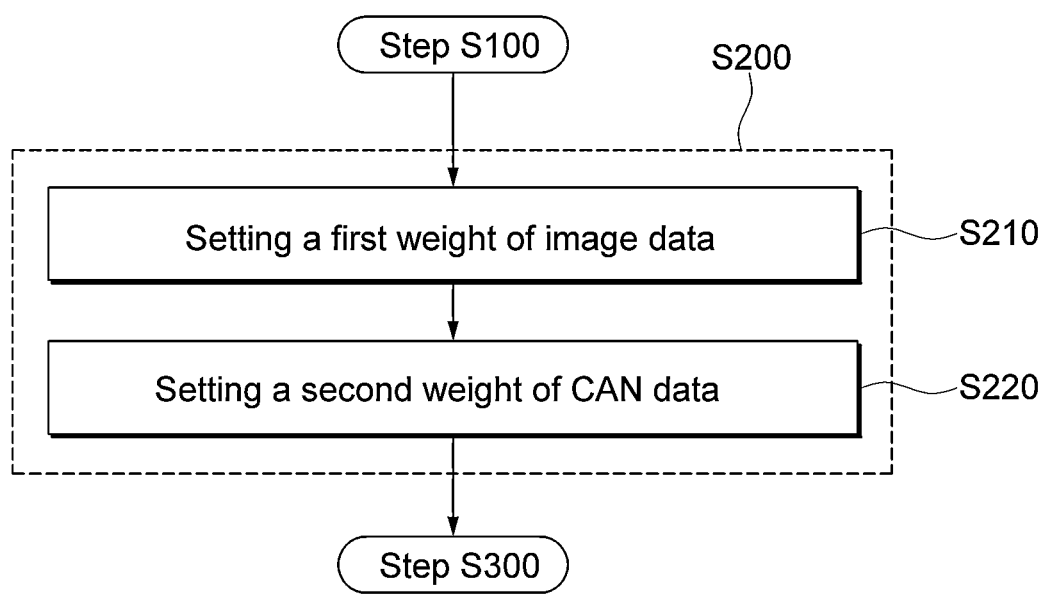
FIG. 3 is a flowchart for illustrating a step of inputting image data and CAN data to a first deep learning algorithm according to an embodiment of the present disclosure.

FIG. 3 is a flowchart for illustrating a step of inputting image data and CAN data to a first deep learning algorithm according to an embodiment of the present disclosure. For instance, FIG. 3 shows an operation of setting weights related to image data and CAN data for the first deep learning algorithm according an embodiment of to the present disclosure.

In step S210, the apparatus 200 for determining the driving risk may set first weights of image data or may assign first weights to image data.

Here, the apparatus 200 for determining the driving risk may set the first weights of the image data while generating labeling data for training the first deep learning algorithm. The first weights may be related to high weights of specific labeling data in the process of generating labeling data corresponding to the image data. For example, the apparatus 200 for determining the driving risk may determine the image data including a child among pedestrians as a riskier driving situation by setting the first weight to the corresponding image data labeled as the risky driving situation from among the image data labeled into one of three driving situations. Similarly, when the image data labeled as the risky driving situation from among the image data labeled into one of three driving situations includes a safety sign, the apparatus 200 for determining the driving risk may determine the image data as a riskier driving situation by assigning the first weight to the corresponding image data. Therefore, labeling data with the first weight may be considered to be the image data corresponding to a riskier driving situation.

The description above shows only one specific example, and thus, it should not be understood that the present disclosure is limited to the specific example.

In step S220, the apparatus 200 for determining the driving risk may set second weights of CAN data or may assign second weights to CAN data.

The apparatus 200 for determining the driving risk may determine risker driving situations by assigning the second weights to the CAN data. For example, when the CAN data are labeled into one of the three driving situations, the apparatus 200 for determining the driving risk may generate labeled data classified into one of the three situations for at least one or more CAN data. Here, the apparatus 200 for determining the driving risk may determine the data labeled as the risky driving situation among the CAN data as a riskier driving situation by assigning the second weight to the corresponding CAN data. More specifically, the apparatus 200 for determining the driving risk may label a situation in which the CAN data is larger than a predetermined first threshold speed as the risky driving situation based on a sudden accelerated speed, label a situation in which the CAN data is less than the predetermined first threshold speed but larger than a second threshold speed as the normal driving situation, and label a situation in which the CAN data is less than the second threshold speed as the safe driving situation. Here, the apparatus 200 for determining the driving risk may assign the second weight to the CAN data that exceeds the first threshold speed and is labeled as the risky driving situation based on the time point at which the CAN data is generated and various information included in the image data captured at the corresponding time point. For example, when the image data corresponding to the time point at which the CAN data is generated includes pedestrians, a safety sign, and a child among the pedestrians, the second weight is assigned, and the corresponding situation is determined as a riskier driving situation.

The first and second weights may be either the same or different as or from each other.

Referring back to FIG. 2, in a step S300, the apparatus 200 for determining the driving risk may capture a first image at a first time point based on the output value of the first deep learning algorithm.

When image data is received, the apparatus 200 for determining the driving risk may capture an image exhibiting the features corresponding to those of the labeled data by utilizing the pre-trained first deep learning algorithm. For example, the apparatus 200 for determining the driving risk may capture the first image exhibiting the features corresponding to those of the data labeled as the risky driving situation from among the risky, normal, and safe driving situations. Therefore, the first image may include features similar or corresponding to the image features included in the labeling data determined as the risky driving situation while a vehicle is driving.

The apparatus 200 for determining the driving risk may record a time point when the first image is captured, namely, when the first image is obtained, as a first time point and capture the first image along with the recorded time point. For example, when the first image is captured, the first time point representing the acquisition time of the first image may be recorded by recording the time point at which the first image is obtained.

In step S400, the apparatus 200 for determining the driving risk may transmit the first image to a connect program.

The apparatus 200 for determining the driving risk may transmit the captured first image to the connect program. The connect program may be a program installed in the form of a application for a driver or a web program that provides information related to a driver's driving risk. Alternatively, the connect program may be a specific application or web program that calculates the driver's insurance premium by determining the driver's driving pattern and risk situations.

The apparatus 200 for determining the driving risk may provide the first image to the connect program without any modification of the first image. In what follows, one specific example will be described in more detail with reference to FIG. 4.

Figure 4:
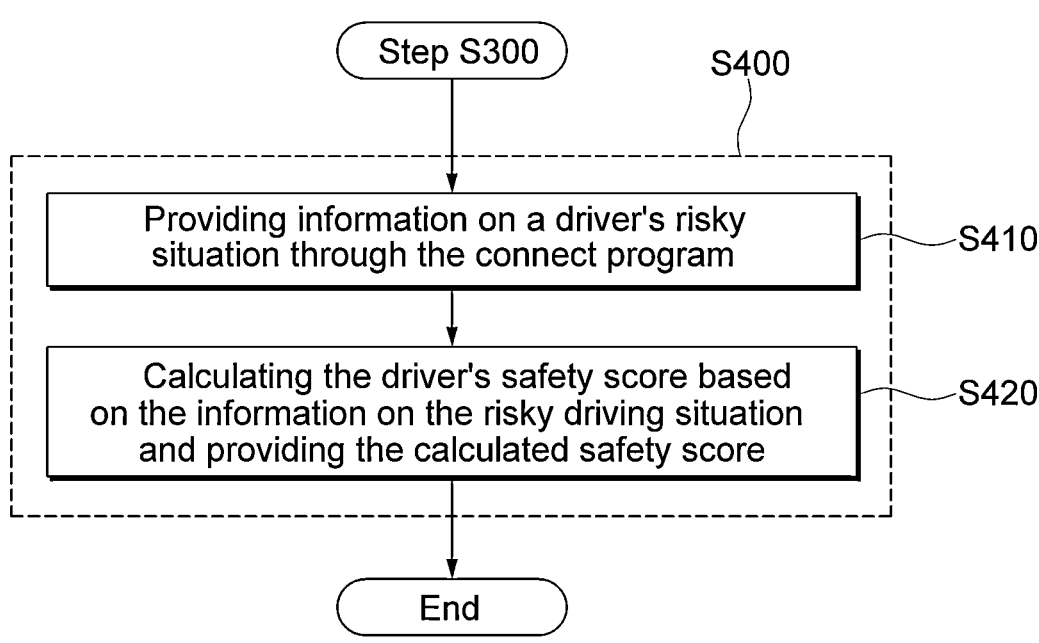
FIG. 4 is a flowchart for illustrating a step of transmitting a first image to a connect program according to an embodiment of the present disclosure.

FIG. 4 is a flowchart illustrating a step of transmitting a first image to a connect program according an embodiment of to the present disclosure.

In step S410, the apparatus 200 for determining the driving risk may provide information on a driver's risky situation through the connect program. The apparatus 200 for determining the driving risk may calculate, from the captured first image, information corresponding to the first image and provide the calculated information to the connect program. For example, the apparatus 200 for determining the driving risk may calculate information, including a first time point at which the first image is captured or obtained, the position of a driving vehicle 100 when the first image is captured or obtained, the presence of other vehicle within the first image, the number of other vehicles included in the first image, the presence of pedestrians in the first image, the number of pedestrians included in the first image, the presence of children among the pedestrians included in the first image, and the number of children in the first image, and provide the calculated information to the connect program as the information related to a risky situation. Through the information provided to the connect program, the driver may learn in what risky situation the vehicle was driving from the connect program and receive information related to the corresponding situation. Afterward, the driver may prepare in advance considering the driver's driving pattern or drive more safely in situations similar to the risky situations.

In step S420, the apparatus 200 for determining the driving risk may calculate the safety score of the driver based on the information on the risky driving situation and provide the calculated safety score to the driver or a user of the connect program.

The apparatus 200 for determining the driving risk may calculate the safety score of the driver based on the information on the risky driving situation and provide the calculated safety score to the driver or a user of the connect program. For example, the apparatus 200 for determining the driving risk may score the information on the risky driving situation described above based on a predetermined criterion and provide the safety score of the driver calculated based on the predetermined criterion through the connect program. For example, the apparatus 200 for determining the driving risk may set a high value to the driver's risk in proportion to the number of children among pedestrians in the first image which is captured while the driver is driving the vehicle 100 because the driving situation is deemed to be risky and provide the risk scores to the connect program. The description above is just one example, and the present disclosure should not be limited to the description above.

In what follows, a process of learning time points for capturing images by utilizing a second deep learning algorithm included in the apparatus 200 for determining the driving risk will be described in detail.

Figure 5:
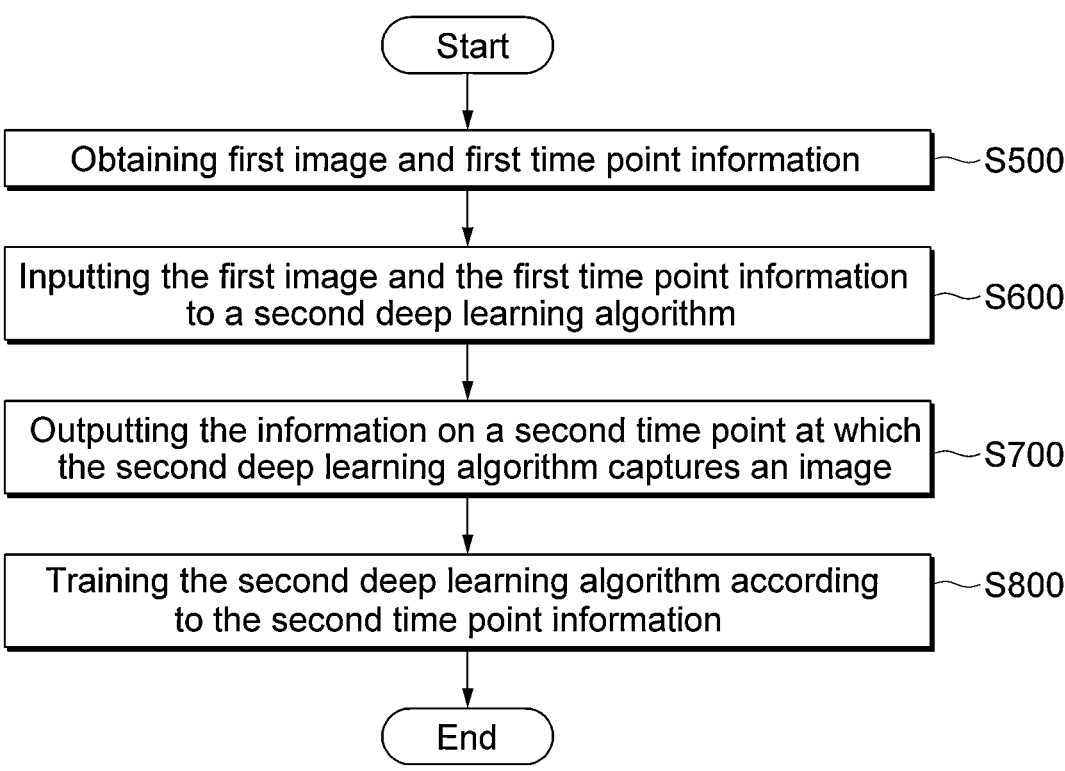
FIG. 5 is a flowchart for illustrating a learning method for a second deep learning algorithm according to an embodiment of the present disclosure.

FIG. 5 is a flowchart for illustrating a learning method for a second deep learning algorithm according to an embodiment of the present disclosure.

Regarding a first time point at which the second deep learning algorithm captures a first image (e.g. an image associated with a risky situation), the apparatus 200 for determining the driving risk may periodically update the process of capturing the first image at the first time point so that the process may be performed more efficiently. More specifically, the apparatus 200 for determining the driving risk may continuously check whether the first time point at which the first deep learning algorithm captures the first image is appropriate as a time point for acquiring an image and may adjust the first time point accordingly. Through the operation described above, instead of acquiring images at all time points, the driving vehicle 100 acquires and utilizes only images at important time points, and this may cause advantages in terms of data resources, data storage capacity, and data processing. A detailed description of the operation above will be given below.

In step S500, the apparatus 200 for determining the driving risk may obtain the first image and the first time point information.

The apparatus 200 for determining the driving risk may obtain the first image captured based on a value output from the first deep learning algorithm and information on the first time point at which the first image is captured.

In step S600, the apparatus 200 for determining the driving risk may input the first image and the first time point information to the second deep learning algorithm.

The second deep learning algorithm may be one type of reinforcement learning algorithm. The reinforcement learning algorithm is a machine learning algorithm concerned with how intelligent agents ought to take actions in an environment in order to maximize the notion of cumulative reward. The reinforcement learning is one of three basic machine learning paradigms, alongside supervised learning and unsupervised learning. Through the second deep learning algorithm, the apparatus 200 for determining the driving risk may determine whether the first time point at which the first image is acquired is the most efficient data acquisition time point or whether the first time point at which the first image is acquired needs to be adjusted.

Here, the second deep learning algorithm, as one type of reinforcement learning algorithms, may allow an apparatus to interact at a given state with respect to an environment, action, and reward and act to achieve a higher reward. Accordingly, the second deep learning algorithm may be largely classified into a model-free reinforcement learning algorithm and a model-based reinforcement learning algorithm, including algorithms utilizing Deep Q-Network (DQN), Q-Learning, genetic, and State-Action-Reward-State-Action (SARSA) techniques. The Q-Learning is a basic form of Reinforcement Learning which uses Q-values (also called action values) to iteratively improve the behavior of the learning agent. The Q-values are defined for states and actions. The SARSA is a reinforcement learning algorithm that is used to learn a policy for an agent interacting with an environment. It is a type of on-policy algorithm, which means that it learns the value function and the policy based on the actions that are actually taken by the agent.

The reinforcement learning algorithm is a kind of unsupervised learning algorithm that learns unlabeled data by taking actions to maximize rewards through interaction with an environment, and the learning is performed based on a given environment, actions, and evaluations according to the problem to learn. In other words, whenever an action is taken, the external environment gives a reward, and reinforcement learning proceeds to maximize the reward. A reinforcement learning algorithm may comprise an agent and an environment, and the environment may comprise states, actions, and rewards. The agent may be an entity that observes a state in the environment and learns to select an action, receives a reward for the action taken by the agent, and takes action in a direction that maximizes the reward. The environment, which refers to the whole system except for the agent, may be probabilistic, and the change and reward of the environment after an action is taken may not be constant. A rule that selects actions to be performed in a specific state is called a policy.

For example, the reinforcement learning algorithm may employ the Bellman equation proposed by Bellman to solve optimal control problems involving agents, which are the main entities of control problems, using the Markov Decision Process (MDP). First, in the MDP, a process is called Markov when the probability that the process at an arbitrary state $S_0$ at the initial time t=0 evolves to arrive at the current state $S_t$ is the same as the probability that the process at a previous state $S_{t-1}$ arrives at the current state $S_t$, which may be expressed by Equation 1 below.

$$P\{R_t = r,\ S_t = s'|S_o, A_0, R_1\ \dots\ S_{t-1}, A_{t-1}\} = P\{R_t = r,\ S_t = s'|\ [\text{Equation 1}]$$
$$S_{t-1}, A_{t-1}\}$$

where, $A_t$ represents an action taken by an agent, and reward $R_t$ numerically expresses the degree of change in the environment in an intended direction considering the environment after the agent has taken the action, namely, considering the surrounding environment. Since the reinforcement learning typically performs learning by assuming that the current state $S_t$ and its previous state $S_{t-1}$ form the Markov relationship, a reward received after one episode is completed may be considered to have a correlation with previous states. Using the relationship above, a value function for DQN learning is derived. The agent probabilistically arrives at the state $S_t$ due to disturbance each time the agent takes an action and promptly acquires a reward according to the state. When one episode is completed, the learning process may be evaluated by the sum of rewards received at each time step. The higher the total reward, the better the learning performance. The expected value of the total sum of the rewards that may be obtained according to the agent's states is called a state value function. The state value function may be expressed by Equation 2 below.

$$v(s) = E[G_r \mid S_t = s] \qquad \text{[Equation 2]}$$

The reason of using the expected value is that the agent reaches the state $S_t$ according to a probability, and $G_t$ represents the total amount of rewards obtained from the environment, which may be expressed by Equation 3.

$$G_t = R_{t+1} + \gamma R_{t+2} + \ldots = \sum_{k=0}^{\infty} \gamma^k R_{t+k+1} \ (\text{where } 0 < \gamma < 1) \qquad \text{[Equation 3]}$$

The equations above describe a basic equation of the reinforcement learning and describe one example that may be performed by the second deep learning algorithm, and therefore, it should be noted that the present disclosure is not limited to a specific equation.

In step S700, the apparatus 200 for determining the driving risk may output the information on a second time point at which the second deep learning algorithm captures an image.

In the second deep learning algorithm included in the apparatus 200 for determining the driving risk, an action, which is the main constituting element of reinforcement learning, may change a time point of capturing an image to at least one or more other time points, the state may be an image capture time point of the first deep learning algorithm, and the reward may be the accuracy or utility of the first deep learning algorithm model for the images acquired at at least one or more time points by the first deep learning algorithm. Alternatively, the reward may be the prediction accuracy of the first deep learning algorithm model. Since the deep learning model's accuracy, utility, and prediction accuracy are not the primary technical features of the present disclosure, any evaluation algorithm or method commonly understood by those skilled in the art may be used to assess the deep learning model.

In other words, it is possible to determine whether a time point at which an image is output and captured by the first deep learning algorithm is an optimal image capturing time point for the first time point by using the second deep learning algorithm, which is one of types of reinforcement learning algorithms. Therefore, through the second deep learning algorithm, which is one of types of reinforcement learning algorithms, rather than acquiring, storing, and processing images at all time points, the apparatus 200 for determining the driving risk may selectively acquire, store, and process images based on specific situations and time points required to determine the actual driving risk, thereby ensuring greater efficiency compared to traditional deep learning models.

In step S800, the apparatus 200 for determining the driving risk may train the second deep learning algorithm according to the second time point information. In other words, the second deep learning algorithm may capture images by continuously updating a plurality of times points for capturing images and use the captured images to improve the prediction accuracy of the first deep learning algorithm.

Through the operations described above, the training of the second deep learning algorithm may be performed continuously, and the prediction accuracy of the first deep learning algorithm model may also be improved.

In what follows, a procedure of outputting information on the second time point will be described in detail with reference to FIG. 6.

Figure 6:
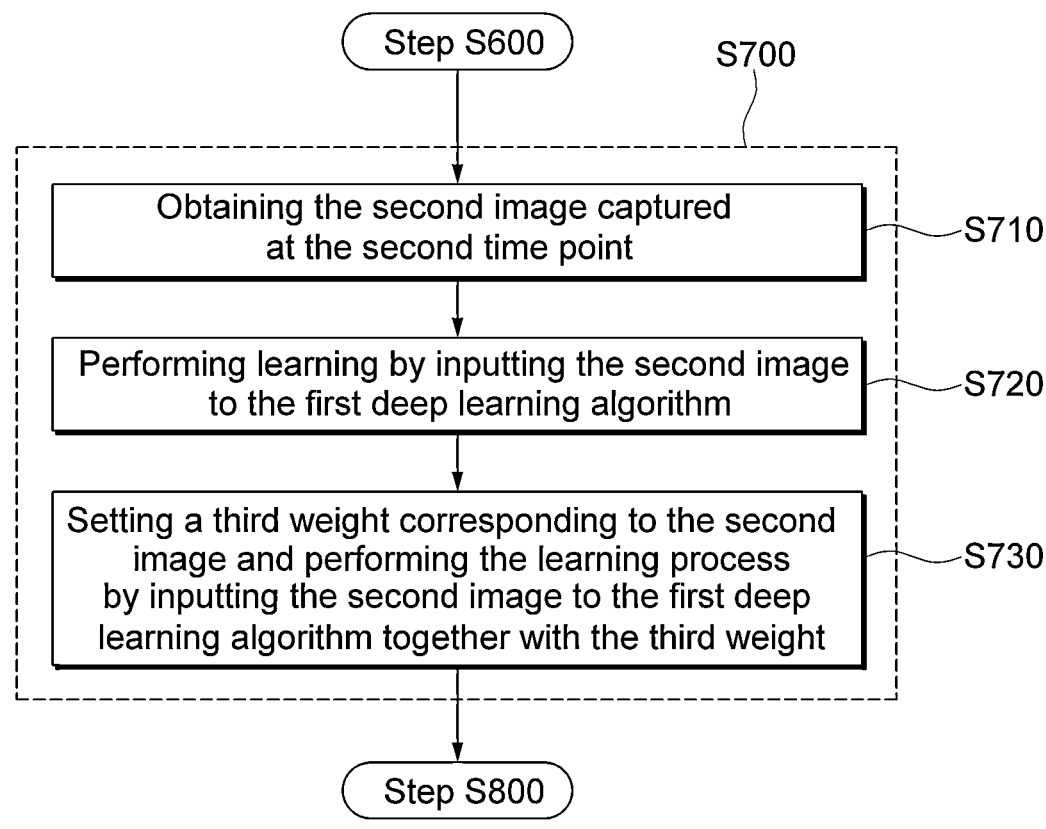
FIG. 6 is a flowchart for illustrating a step of outputting information on a second time point by a second deep learning algorithm according to an embodiment of the present disclosure.

FIG. 6 is a flowchart for illustrating a step of outputting information on a second time point by a second deep learning algorithm according to an embodiment of the present disclosure.

In step S710, the apparatus 200 for determining the driving risk may acquire the second image captured at the second time point.

As described in detail with reference to FIG. 5, the second deep learning algorithm may control an action, which is a primary factor of reinforcement learning, in a direction of improving prediction accuracy of the first deep learning algorithm by performing the reinforcement learning at a plurality of time points. During the learning operation, the second deep learning algorithm may determine whether acquiring an image at the second time point rather than the first time point improves the prediction accuracy of the first deep learning algorithm.

In step S720, the apparatus 200 for determining the driving risk may perform the learning operation by inputting a second image to the first deep learning algorithm. Assuming that information on the second time point is obtained from the second deep learning algorithm and the image acquired at the second time point is the second image, the apparatus 200 for determining the driving risk may perform the learning process by inputting the second image to the first deep learning algorithm. At this time, the apparatus 200 for determining the driving risk may process the second image in the same way as applied to process other labeled image data including the first image, but the second image may be processed differently from the other labeled image data.

The different processing may be described through the S730 step. In step S730, the apparatus 200 for determining the driving risk may perform the learning process by inputting the second image to the first deep learning algorithm together with a third weight corresponding to the second image.

Here, the apparatus 200 for determining the driving risk may set the third weight assigned to the second image and process the features of the second image more heavily than those of other images including the first image. The intensive processing of the second image may be achieved by setting a higher value to the third weight compared to the other weights described above. Therefore, the third weight value is set to be higher than the first weight value and the second weight value, while the third weight value can be set to be the same value as the first and second weight values.

Through the operations above, the apparatus 200 for determining the driving risk may utilize the second image, which is an image obtained based on the information on the second time point, in the first deep learning algorithm, thereby obtaining a more efficient and accurate deep learning model.

Figure 7:
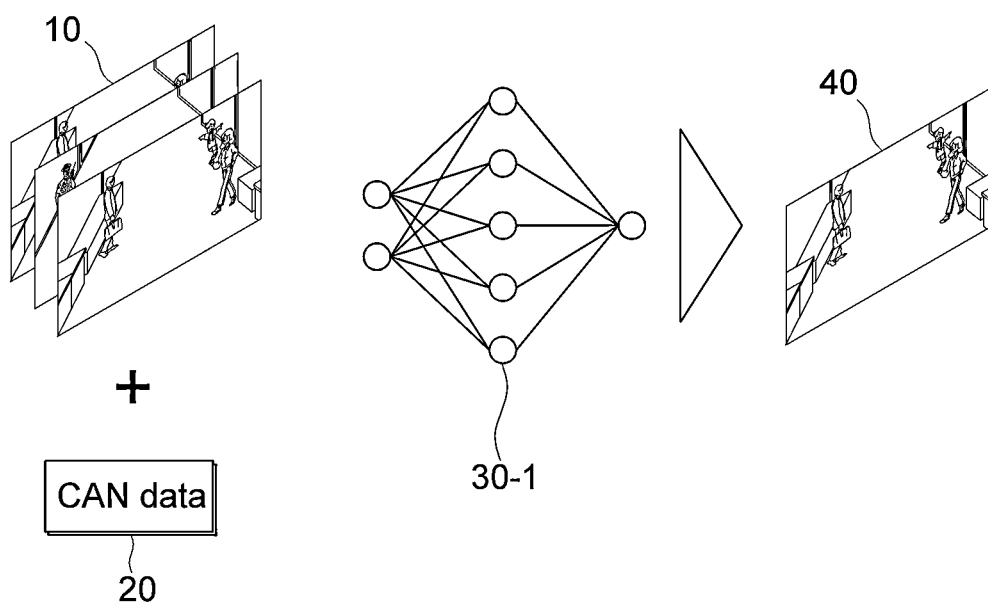
FIG. 7 is a conceptual diagram for illustrating a method for capturing a first image by inputting image data and CAN data by a first deep learning algorithm according to an embodiment of the present disclosure.
Figure 8:
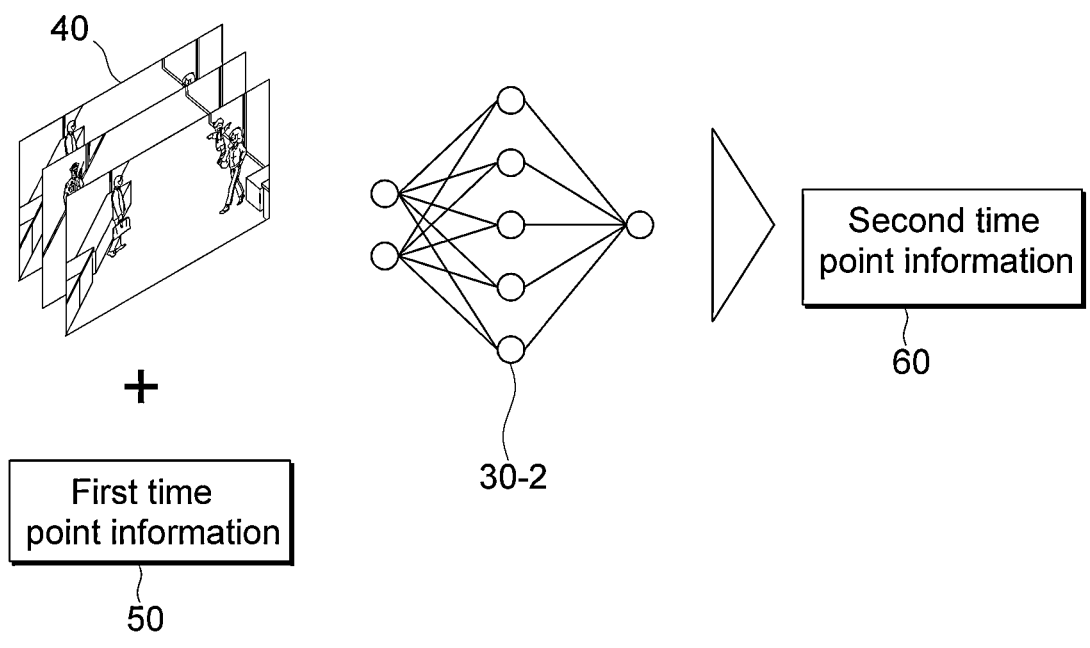
FIG. 8 is a conceptual diagram for illustrating a method for outputting information on a second time point by learning information associated with a first time point by a second deep learning algorithm according to an embodiment of the present disclosure.

In what follows, the first and second deep learning algorithms included in the apparatus 200 for determining the driving risk according to an embodiment of the present disclosure will be describe in detail with reference to FIGS. 7 and 8.

FIG. 7 is a conceptual diagram for illustrating a method for capturing a first image by inputting image data and CAN data by a first deep learning algorithm according to an embodiment of the present disclosure.

Referring to FIG. 7, image data 10 and CAN data 20 may be input to the first deep learning algorithm 30-1, information on the first image 40 associated with or related to the first time point may be generated or produced, and the apparatus 200 for determining the driving risk may capture the first image 40 associated with or related to the first time point. Here, the image data 10 may be image data acquired while the vehicle 100 is driving, and the image data 10 may also be acquired when the vehicle 100 is stationary.

Here, the first deep learning algorithm 30-1 may be a pre-trained deep learning algorithm. When receiving a plurality of image data 10 and CAN data 20, the first deep learning algorithm 30-1 may output information on the image data most similar to specific data labeled during a pre-learning process through architecture extracting feature values from the first deep learning algorithm. During the process above, the apparatus 200 for determining the driving risk may determine or extract the first time point, which is associated with information on the most similar image data, capture the first image 40 at the first time point, and store the captured first image 40.

As described above, the first deep learning algorithm may be a deep learning algorithm trained through labeled image data pre-configured for risky driving situations. Since the first deep learning algorithm has already been described above, specific descriptions thereof will be omitted.

FIG. 8 is a conceptual diagram for illustrating a method for outputting information on a second time point by learning information associated with a first time point by a second deep learning algorithm according to an embodiment of the present disclosure.

For at least one or more first images 40 captured by the apparatus 200 for determining the driving risk, information on the second time point may be output through the second deep learning algorithm 30-2, which is one type of reinforcement learning algorithms, based on the first time point information 50 corresponding to each of the first images 40.

Here, the second deep learning algorithm 30-2 may be a pre-trained reinforcement learning algorithm. Therefore, when receiving the first image 40 and the first time point information 50, the second deep learning algorithm 30-2 may output information 60 on the second time point to improve the prediction accuracy of the first deep learning algorithm. The first deep learning algorithm captures an image based on the second time point and is trained based on the image captured at the second time point. As a result, the second time point information 60 may be used to improve the prediction accuracy of the first deep learning algorithm. Meanwhile, since it has already been described above that the apparatus 200 for determining the driving risk may utilize the third weight corresponding to the second time point 60, descriptions related thereto will be omitted.

As shown in FIGS. 7 and 8, the apparatus 200 for determining the driving risk may determine driver's risky driving situations through the first deep learning algorithm 30-1 and the second deep learning algorithm 30-2 and improve the process of acquiring images related to the risky driving situations more accurately with less resources.

In what follows, a system to which some embodiments of the present disclosure may be applied will be described with reference to FIG. 9.

Figure 9:
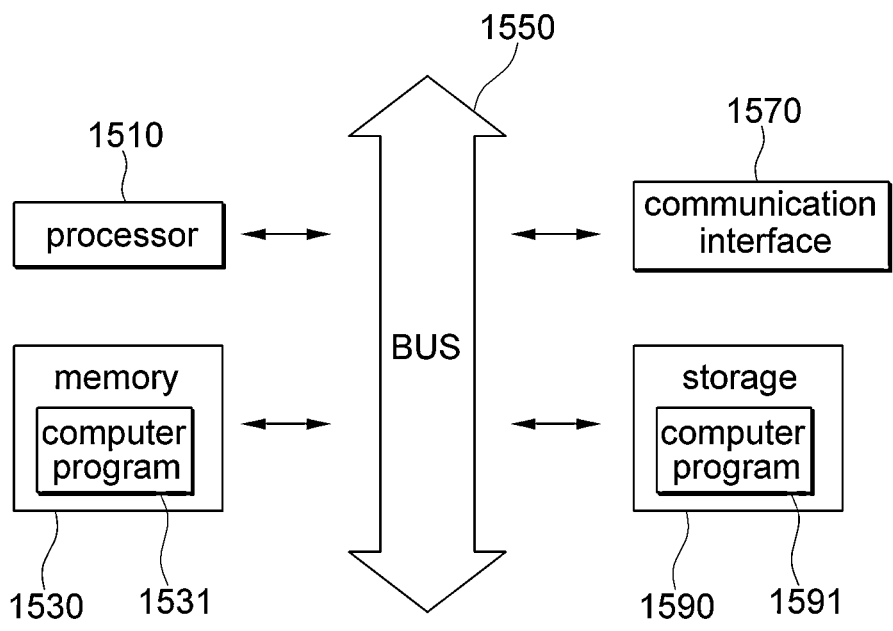
FIG. 9 is a block diagram for illustrating a computing device capable of implementing an apparatus and/or a system according to various embodiments of the present disclosure.

FIG. 9 is a block diagram for illustrating a computing device capable of implementing an apparatus and/or a system according to various embodiments of the present disclosure. The control system 110 and/or the apparatus 200 for the determination the driving risk may be implemented with a computing device 150 illustrated in FIG. 9, although not required.

The computing device 1500 may comprise one or more processors 1510, a bus 1550, a communication interface 1570, a memory 1530 to which a computer program 1591 executed by the processor 1510 is loaded, and a storage 1590 storing the computer program 1591. However, FIG. 9 shows only those constituting elements related to some embodiments of the present disclosure. Therefore, it should be understood by those skilled in the art to which the present disclosure belongs that other general-purpose constituting elements may be included in addition to the constituting elements shown in FIG. 9 and one or more elements shown in FIG. 9 may be omitted.

The processor 1510 controls the overall operation of each constituting element of the computing device 1500. The processor 1510 may include a central processing unit (CPU), a micro-processor unit (MPU), a micro-controller unit (MCU), a graphics processing unit (GPU), or any type of processor well known in the art of the present disclosure. Also, the processor 1510 may perform an operation for at least one application or program for executing the method according to certain embodiments of the present disclosure. The computing device 1500 may be equipped with one or more processors.

The memory 1530 stores various types of data, instructions, commands and/or information. The memory 1530 may load one or more programs 1591 from the storage 1590 to execute the method according to some embodiments of the present disclosure. The memory 1530 may be implemented by using a volatile memory such as RAM, but the technical scope of the present disclosure is not limited to any specific type of memory.

The bus 1550 provides a communication function between the constituting elements of the computing device 1500. The bus 1550 may be implemented by using various bus types, such as address bus, data bus, and control bus.

The communication interface 1570 supports wired and/or wireless Internet communication of the computing device 1500. Also, the communication interface 1570 may support various communication methods in addition to the Internet communication. To this end, the communication interface 1570 may be constructed using communication modules well known in the art to which the present disclosure belongs.

According to some embodiments of the present disclosure, the communication interface 1570 may be omitted.

The storage 1590 may permanently or temporarily store the one or more programs 1591 and various types of data.

The storage 1590 may include a non-volatile memory such as a read only memory (ROM), an erasable programmable ROM (EPROM), an electrically erasable programmable ROM (EEPROM), a flash memory, a hard disk, a removable disk, or a computer-readable recording medium of an arbitrary type well known in the art to which the present disclosure belongs.

The computer program 1591 may include one or more instructions, and commands which, when loaded into the memory 1530, instruct the processor 1510 to perform methods/operations according to various embodiments of the present disclosure. In other words, the processor 1510 may perform methods/operations according to various embodiments of the present disclosure by executing the one or more instructions.

So far, various embodiments of the present disclosure and effects according to some embodiments have been described with reference to FIGS. 1 to 9. The technical effects of the present disclosure are not limited to those effects described above, and other technical effects not mentioned herein may be understood to those skilled in the art to which the present disclosure belongs from the description of the present disclosure.

The technical principles and spirit of the present disclosure, described so far with reference to FIGS. 1 to 8, may be implemented in computer-readable code on a computer-readable medium. The computer-readable recording medium may include, for example, a removable recording medium (CD, DVD, Blu-ray Disc, USB storage device, removable hard disk), or a stationary recording medium (ROM, RAM, or a built-in computer hard disk). The computer program recorded in a computer-readable recording medium may be transmitted to a different computing device through a network such as the Internet and installed in the different computing device, thereby being used in the different computing device.

In the above, the fact that all the constituting elements comprising an embodiment of the present disclosure are combined together or operate in conjunction with one another does not necessarily limit the technical principles and spirit of the present disclosure to the specific embodiment. In other words, all the constituting elements may operate by being selectively integrated into one or more combinations as long as the combinations fall within the technical scope of the present disclosure.

Although the operations are shown in a particular order in the figure, it should not be understood that the operations have to be performed in that order or in the sequential order according to which the operations are shown or that a desired result may be achieved only when all the illustrated operations are executed. In certain situations, multitasking and parallel processing may be advantageous. Moreover, separation of various configurations in the embodiments described above should not be understood as being required necessarily, and the program components and systems described above may generally be integrated into a single software product or packaged into multiple software products.

So far, although the embodiments of the present disclosure have been described with reference to appended drawings, it should be understood by those skilled in the art to which the present disclosure belongs that the present disclosure may be embodied in other specific forms without changing the technical principles or essential characteristics of the present disclosure. Therefore, the embodiments described above should be regarded as being illustrative rather than restrictive in every aspect. The technical scope of the present disclosure should be determined by the appended claims given below, and it should be understood that all of the technical principles found within the range equivalent to the technical scope of the present disclosure should be interpreted to belong thereto.

What is claimed is:

1. An apparatus for determining driving risks of a driver using one or more deep learning algorithms, the apparatus comprising:

a memory configured to store instructions that are executable; and one or more processors configured to execute the instructions to perform operations comprising: receiving image data and Controller Area Network (CAN) data obtained by a vehicle comprising a light detection and ranging (lidar) sensor and/or a camera sensor, inputting the obtained image data and CAN data to a first deep learning algorithm trained through pre-stored image data to output image features related to driving risks of a driver driving the vehicle, outputting the image features related to the driving risks of the driver by the first deep learning algorithm, and capturing a first image corresponding to the output image features and transmitting the captured first image to a predetermined program, wherein the one or more processors are configured to transmit information on a risky situation of the driver with the first image to the predetermined program.

2. The apparatus of claim 1, wherein the first deep learning algorithm is based on a Convolutional Neural Network (CNN) and includes at least one of a convolution layer, a fully connected layer, and an activated function layer.

3. The apparatus of claim 2, wherein the image features are image features extracted by at least one filter included in the CNN.

4. The apparatus of claim 1, wherein the one or more processors are configured to calculate a safety score of the driver based on the first image, and transmit the calculated safety score of the driver with the information on the risky situation of the driver to the predetermined program.

5. An apparatus for determining driving risks of a driver using one or more deep learning algorithms, the apparatus comprising:

a memory configured to store instructions that are executable; and one or more processors configured to execute the instructions to perform operations comprising: receiving image data and Controller Area Network (CAN) data obtained by a vehicle comprising a light detection and ranging (lidar) sensor and/or a camera sensor, inputting the obtained image data and CAN data to a first deep learning algorithm trained through pre-stored image data to output image features related to driving risks of a driver driving the vehicle, outputting the image features related to the driving risks of the driver by the first deep learning algorithm, and capturing a first image corresponding to the output image features and transmitting the captured first image to a predetermined program, wherein the one or more processors are configured to:

calculate a first time point of capturing the first image corresponding to the output image features, input the first image and the first time point to a second deep learning algorithm trained to output features at time points of capturing pre-stored images related to the driving risks of the driver driving the vehicle, and output a second time point of capturing a second image by the second deep learning algorithm.

6. The apparatus of claim 5, wherein the second deep learning algorithm is a reinforcement learning algorithm including at least one of algorithms utilizing Deep Q-Network (DQN), Q-learning, genetic, and/or State-Action-Reward-State-Action (SARSA) techniques.

7. The apparatus of claim 6, wherein:

the second time point is different from the first time point, the second image captured at the second time point is applied to the first deep learning algorithm, and the image features related to the second image output from the first deep learning algorithm are different from image features related to a first image output from the first deep learning algorithm.

8. The apparatus of claim 7, wherein the first deep learning algorithm is configured to learn image features of the second image by applying the second image captured at the second time point to the first deep learning algorithm.

9. The apparatus of claim 8, wherein the one or more processors are configured to, when the first deep learning algorithm learns the image features of the second image, set weights for feature learning, wherein the weights set for the feature learning are different from weights which were used during training of the pre-stored image data by the first deep learning algorithm.

10. A vehicle comprising:

sensors comprising at least one of a lidar sensor and a camera sensor;

a control system configured to control the vehicle;

at least one interface configured to receive and transmit signals associated with obstacles and other vehicles; and a determination apparatus comprising one or more processors configured to:

receive image data from at least one of the sensors and CAN data, input the image data and the CAN data to a first deep learning algorithm trained through pre-stored image data to output image features related to driving risks of a driver driving the vehicle, output the image features related to the driving risks of the driver by the first deep learning algorithm, and capture a first image corresponding to the output image features and transmit the captured first image to a predetermined program, wherein the one or more processors of the determination apparatus are configured to calculate a safety score of the driver based on the first image and transmit the calculated safety score of the driver with the information on the risky situation of the driver to the predetermined program.

11. The vehicle of claim 10, wherein the first deep learning algorithm is based on a Convolutional Neural Network (CNN) and includes at least one of a convolution layer, a fully connected layer, and an activated function layer.

12. The vehicle of claim 11, wherein the image features are image features extracted by at least one filter included in the CNN.

13. The vehicle of claim 10, wherein the one or more processors of the determination apparatus are configured to calculate a safety score of the driver based on the first image and transmit the calculated safety score of the driver with the information on the risky situation of the driver to the predetermined program.

14. The vehicle of claim 10, wherein the one or more processors of the determination apparatus are configured to:

calculate a first time point of capturing a first image corresponding to the output image features, input the first image and the first time point to a second deep learning algorithm trained to output features at time points of capturing pre-stored images related to the driving risks of the driver driving the vehicle, and output a second time point of capturing a second image by the second deep learning algorithm.

15. The vehicle of claim 14, wherein the second deep learning algorithm is a reinforcement learning algorithm including at least one of algorithms utilizing DQN, Q-learning, genetic, and SARSA techniques.

16. The vehicle of claim 15, wherein: the second time point is different from the first time point, the second image captured at the second time point is applied to the first deep learning algorithm, and the image features related to the second image output from the first deep learning algorithm are different from image features related to a first image output from the first deep learning algorithm.

17. The vehicle of claim 16, wherein the first deep learning algorithm is configured to learn image features of the second image by applying the second image captured at the second time point to the first deep learning algorithm.

18. The vehicle of claim 17, wherein the one or more processors of the determination apparatus are configured to, when the first deep learning algorithm learns the image features of the second image, set weights for feature learning, wherein the weights set for the feature learning are different from weights which were used during training of the pre-stored image data by the first deep learning algorithm.

* * * * *